United States Patent
Tanaka et al.

(10) Patent No.: US 8,412,181 B2
(45) Date of Patent: *Apr. 2, 2013

(54) MOBILE STATION

(75) Inventors: Itsuma Tanaka, Yokohama (JP);
Yasuhiro Kato, Yokohama (JP); Mikio Iwamura, Yokohama (JP); Masashi Kanauchi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/121,155

(22) PCT Filed: Sep. 25, 2009

(86) PCT No.: PCT/JP2009/066674
§ 371 (c)(1),
(2), (4) Date: Jun. 9, 2011

(87) PCT Pub. No.: WO2010/035796
PCT Pub. Date: Apr. 1, 2010

(65) Prior Publication Data
US 2011/0237245 A1    Sep. 29, 2011

(30) Foreign Application Priority Data
Sep. 26, 2008   (JP) .................................. 2008-249296

(51) Int. Cl.
*H04W 24/00*   (2009.01)

(52) U.S. Cl. ..................................... 455/423; 455/435.1

(58) Field of Classification Search .................. 455/403, 455/404.2, 422.1, 423–425, 432.1, 433, 435.1–435.3
See application file for complete search history.

(56) References Cited

U.S. PATENT DOCUMENTS 7,773,992 B2 *   8/2010   Glazko et al. .................. 455/436
2010/0113008 A1 *   5/2010   Wang et al. .................... 455/423

OTHER PUBLICATIONS

International Search Report issued in PCT/JP2009/066674, mailed on Nov. 2, 2009, with English translation, 3 pages.
3GPP TS 36.304 V8.3.0; "3rd Generation Partnership Project; Technical Specification Group Radio Access Network; Evolved Universal Terrestrial Radio Access (E-UTRA); User Equipment (UE) procedures in idle mode (Release 8)"; Sep. 2008 (28 pages).
3GPP TSG RAN WG2 #58 Meeting, R2-072382; "Radio Link Failure Recovery"; Nokia Siemens Networks, Alcatel-Lucent, Ericsson, Motorola, Nokia, Nortel, NTT DoCoMo, Qualcomm Europe, Verizon Wireless; Jun. 25-29, 2007 (8 pages).
3GPP TSG CT WG4 #38 Meeting, C4-080674; "Pseudo-CR on Introduction of ISR (Idle-mode Signalling Reduction"; Huawei; Apr. 7-11, 2008 (5 pages).
3GPP TS 23.401 V9.1.0; "3rd Generation Partnership Project; Technical Specification Group Services and System Aspects; General Packet Radio Service (GPRS) enhancements for Evolved Universal Terrestrial Radio Access Network (E-UTRAN) access (Release 9)"; Jun. 2009 (234 pages).

(Continued)

*Primary Examiner* — Ajit Patel
(74) *Attorney, Agent, or Firm* — Osha Liang LLP

(57) ABSTRACT

In a mobile station (UE) according to the present invention, an AS function is configured to notify, when detecting a failure in a radio link established with the radio base station is detected or when discovering a cell subject to a location registration by a cell selection process, a NAS function of the detection or the discovery; and the NAS function is configured to transmit, in response to the notification, a location registration request signal to a mobile switching center (MME).

2 Claims, 5 Drawing Sheets

OTHER PUBLICATIONS

3GPP TS 23.060 V9.1.1; "3rd Generation Partnership Project; Technical Specification Group Services and System Aspects; General Packet Radio Service (GPRS); Service description; Stage 2 (Release 9)"; Jun. 2009 (283 pages).

3GPP TS 36.331 V8.6.0; "3rd Generation Partnership Project; Technical Specification Group Radio Access Network; Evolved Universal Terrestrial Radio Access (E-UTRA) Radio Resource Control (RRC) Protocol specification (Release 8)", Jun. 2009 (207 pages).

3GPP TS 24.008 V8.6.0; "3rd Generation Partnership Project; Technical Specification Group Core Network and Terminals; Mobile radio interface Layer 3 specification; Core network protocols; Stage 3 (Release 8)"; Jun. 2009 (582 pages).

3GPP TS 24.301 V8.2.1; "3rd Generation Partnership Project; Technical Specification Group Core Network and Terminals; Non-Access-Stratum (NAS) protocol for Evolved Packet System (EPS); Stage 3 (Release 8)"; Jun. 2009 (252 pages).

Office Action in Japanese Patent Application No. 2009-179682 mailed Nov. 4, 2009, with English translation thereof (4 pages).

Office Action in Japanese Patent Application No. 2009-179661 mailed Nov. 4, 2009, with English translation thereof (4 pages).

Office Action in Japanese Patent Application No. 2008-249296 mailed Apr. 27, 2010, with English translation thereof (4 pages).

Office Action in Japanese Patent Application No. 2008-249296 mailed Oct. 27, 2009, with English translation thereof (4 pages).

Extended European Search Report issued in EP 09 81 6210 mailed on Aug. 1, 2012 (8 pages).

3GPP TS 23.110 v.7.0.0; "Digital Cellular Telecommunications System (Phase 2+); Universal Mobile Telecommunications System (UMTS); UMTS Access Stratum Services and Functions," Jun. 2007 (27 pages).

3GPP TS 23.101 v.7.0.0; "Universal Mobile Telecommunications System (UMTS); General UMTS Architecture," Jun. 2007 (19 pages).

3GPP TS 23.122 v.7.12.1; "Digital Cellular Telecommunications System (Phase 2+); Universal Mobile Telecommunications System (UMTS); Non-Access-Stratum (NAS) Functions Related to Mobile Station (MS) in Idle Mode," Apr. 2008 (37 pages).

* cited by examiner

MOBILE STATION

TECHNICAL FIELD

The present invention relates to a mobile station provided with a first protocol function (AS function) corresponding to a first protocol (AS: Access Stratum) terminated between the mobile station and a radio base station and a second protocol function (NAS function) corresponding to a second protocol (NAS: Non Access Stratum) terminated between the mobile station and a mobile switching center.

BACKGROUND ART

With reference to FIG. 7, a re-connection process in a mobile communication system of the LTE (Long Term Evolution) scheme will be explained.

As illustrated in FIG. 7, in step S501, when a mobile station UE detects a quality deterioration of a radio link (specifically, an RRC connection) established with a radio base station eNB1, the mobile station UE activates a timer T310.

In step S502, when the quality deterioration of the radio link is not recovered before the timer T310 expires, then the mobile station UE detects a failure in the radio link (RLF: Radio Link Failure) and activates a timer T311.

During a time that the timer T311 is activated, the mobile station UE performs a cell selection process. And, when a specific cell is discovered, the mobile station UE attempts to establish a radio link with a radio base station that manages the specific cell. At this time, when a "UE Context" of the mobile station UE is managed in the specific cell, then the establishment of the radio link is successful.

In step S503, when the specific cell is not discovered during a time that the timer T311 is activated, when the "UE Context" of the mobile station UE is not managed in the discovered cell, or when an inter-RAT cell is discovered during a time that the timer T311 is activated, then the mobile station UE is transitioned to an idle state (RRC_Idle state).

Thereafter, in step 504, the mobile station UE starts camping on a cell under the control of a radio base station eNB2.

In step S505, the mobile switching center MME does not know that the mobile station UE has started the camping on the cell under the control of the radio base station eNB2, and therefore, the mobile switching center MME transmits downlink data destined to the mobile station UE, to a radio base station eNB1. Therefore, the downlink data destined to the mobile station UE is lost without reaching the mobile station UE.

In step S507, the radio base station eNB1 releases an S1 connection with the mobile switching center MME for the mobile station UE, because there is no response, within a predetermined period from the mobile station UE, to an uplink synchronization request signal transmitted to the mobile station UE in step S506.

In step S508, the mobile switching center MME transmits a paging signal to the mobile station UE.

In step S509, in response to the received paging signal, the mobile station UE establishes a radio link with the radio base station eNB2 by transmitting a service request to the mobile switching center MME.

In step S510, the radio base station eNB2 transmits downlink data via the radio link established in step S509.

SUMMARY OF THE INVENTION

Problems to be Solved by the Invention

However, the conventional mobile communication system has a problem in that the network cannot detect the transition of a state of the mobile station UE (transition from an RRC_Connected state to an RRC_Idle state) resulting from the RLF, until the downlink data is generated, and the downlink data generated in this period is lost without reaching the mobile station UE.

The conventional mobile communication system has another problem that the mobile station is configured to perform a re-connection process after receiving the paging signal from the mobile switching center MME when the mobile station UE is transitioned to the RRC_Idle state resulting from the RLF, and thus, it takes time for the radio link (U plane) to recover.

Therefore, the present invention is intended to overcome the above-described problem. An object of the present invention is to provide a mobile station capable of making it difficult for downlink data to be lost even if the mobile station UE is transitioned to an idle state resulting from RLF.

Means for Solving the Problem

A first aspect of the present invention is summarized as a mobile station including: a first protocol function corresponding to a first protocol terminated between the mobile station and a radio base station; and a second protocol function corresponding to a second protocol terminated between the mobile station and a mobile switching center, wherein the first protocol function is configured to notify, when detecting a failure in a radio link established with the radio base station, or when discovering a cell subject to a location registration by a cell selection process, the second protocol function of the detection; and the second protocol function is configured to transmit, in response to the notification, a location registration request signal to the mobile switching center.

In the first aspect of the present invention, the location registration request signal can include a flag requesting a recovery of the radio link.

In the first aspect of the present invention, the second protocol function can be configured to transmit the location registration request signal, after an elapse of a predetermined period from receiving the notification, or during a time that the predetermined period elapses from receiving the notification.

In the first aspect of the present invention, the second protocol function can be configured to determine whether to transmit the location registration request signal, based on a type of communications performed via the radio link in which the failure has been detected.

A second aspect of the present invention is summarized as a mobile station including: a first protocol function corresponding to a first protocol terminated between the mobile station and a radio base station; and a second protocol function corresponding to a second protocol terminated between the mobile station and a mobile switching center, wherein the first protocol function is configured to transition to an idle state after an elapse of a first predetermined period after the failure in the radio link established with the radio base station is detected; and the second protocol function is configured to transmit a location registration request signal to the mobile switching center, after a second predetermined period elapses after data is transmitted last, or during a time that the second predetermined period elapses after data is transmitted last.

In the second aspect of the present invention, the second predetermined period can be configured to be measured by the first protocol function or the second protocol function.

Effect of the Invention

As explained above, according to the present invention, it is possible to provide a mobile station capable of making it difficult for downlink data to be lost even if the mobile station UE is transitioned to an idle state resulting from RLF.

BEST MODES FOR CARRYING OUT THE INVENTION

Mobile Communication System According to a First Embodiment of the Present Invention With reference to FIG. 1 through FIG. 4, a mobile communication system according to a first embodiment of the present invention will be explained.

Figure 1:
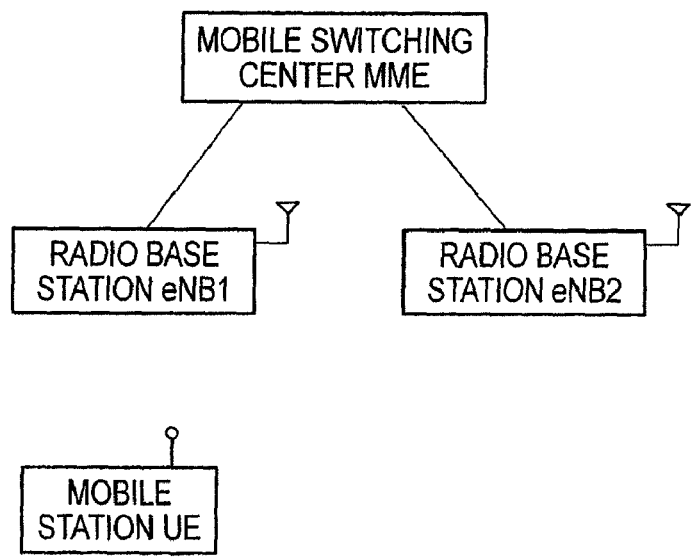
FIG. 1 is an overall configuration diagram of a mobile communication system according to a first embodiment of the present invention.

As illustrated in FIG. 1, the mobile communication system according to the embodiment is a mobile communication system of the LTE scheme, and includes: a mobile switching center MME; a radio base station eNB1/eNB2; and a mobile station UE.

Figure 2:
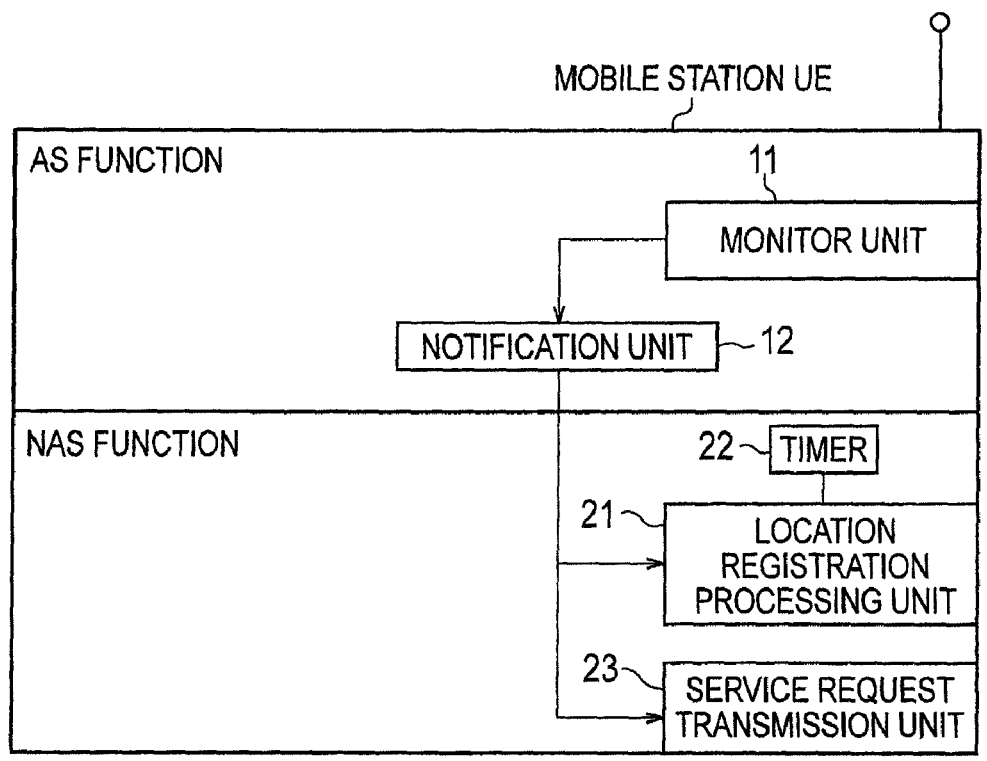
FIG. 2 is a functional block diagram of a mobile station according to the first embodiment of the present invention.

As illustrated in FIG. 2, the mobile station UE according to the embodiment includes: an AS function (first protocol function) corresponding to an AS (first protocol) terminated between the mobile station UE and the radio base station eNB; and an NAS function (second protocol function) corresponding to an NAS (second protocol) terminated between the mobile station UE and the mobile switching center MME.

The AS function includes a monitor unit 11 and a notification unit 12.

The monitor unit 11 is configured to monitor the generation of a failure (RLF) in a radio link (for example, an RRC connection) established with the radio base station eNB1 and broadcast information including a location registration area.

The notification unit 12 is configured to notify, to the NAS function, the detection of the failure (RLF) in the radio link (for example, an RRC connection) established with the radio base station eNB1, when the failure is detected.

Alternately, when a cell subject to location registration is discovered based on the location registration area included in the received broadcast information, the notification unit 12 is configured to notify the NAS function of the discovery, in a cell selection process.

The NAS function includes a location registration processing unit 21, a timer 22, and a service request transmission unit 23.

The location registration processing unit 21 is configured to transmit a location registration request signal (TAU: Tracking Area Update) to the mobile switching center MME, when the notification indicating that the RLF has been detected is received from the AS function, or when the cell subject to the location registration is discovered in the cell selection process and there is no uplink data to be transmitted.

In this case, the location registration request signal may be configured to include a flag (Active Flag) requesting a recovery of the radio link.

The location registration processing unit 21 may also be configured to transmit the location registration request signal, after an elapse of a predetermined period from receiving the above-described notification.

The location registration processing unit 21 may also be configured to transmit the location registration request signal, during a time that the predetermined period elapses from receiving the above-described notification.

The predetermined period is configured to be measured by a timer 22. The predetermined time may be a time autonomously generated by the mobile station UE, a time notified from the network, or a time obtained by multiplying the time notified from the network by a random number. The predetermined time may be configured to differ depending on each mobile station UE or each group of the mobile stations UE.

The service request transmission unit 23 is configured to transmit a service request signal (Service Request) to the mobile switching center MME, when the notification indicating that the RLF is detected is received from the AS function and there is the uplink data to be transmitted.

The service request signal is a signal used in the re-connection process by the mobile station UE, i.e., a signal requesting an establishment of the radio link (RRC connection) with the radio base station eNB2.

Hereinafter, with reference to FIG. 3 and FIG. 4, an operation of the mobile communication system according to the embodiment will be explained.

Firstly, a first operation of the mobile communication system according to the embodiment will be described with reference to FIG. 3.

Figure 3:
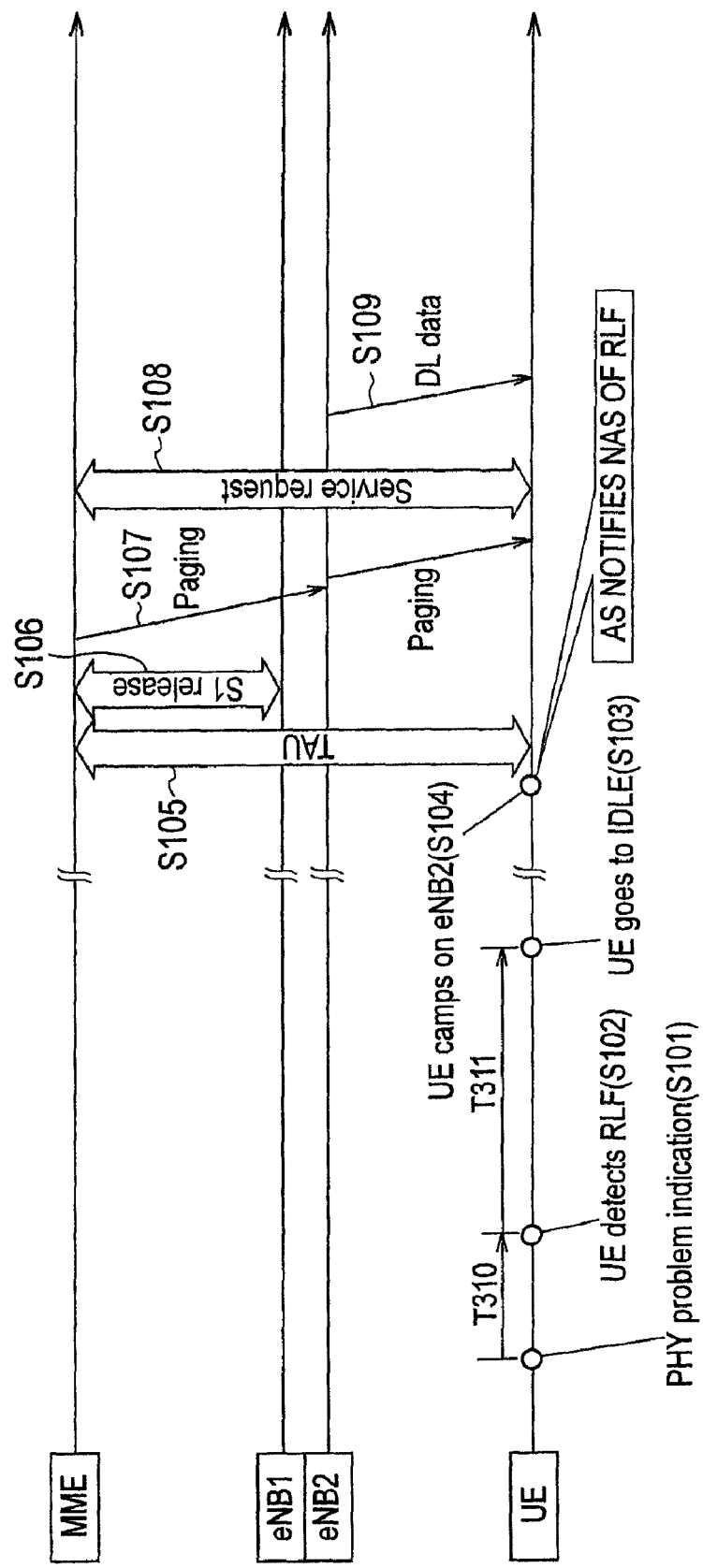
FIG. 3 is a diagram explaining an operation of the mobile communication system according to the first embodiment of the present invention.

As illustrated in FIG. 3, in step S101, the AS function of the mobile station UE activates a timer T310, when the quality deterioration of the radio link (RRC connection) established with the radio base station eNB1 is detected.

In step S102, when the quality deterioration of the radio link is not recovered before the timer T310 expires, then the AS function of the mobile station UE detects the RLF and activates a timer T311.

During a time that the timer T311 is activated, the AS function of the mobile station UE performs a cell selection process. And, when a specific cell is discovered, then the AS function of the mobile station UE attempts to establish a radio link with the radio base station managing the specific cell.

In step S103, when the specific cell is not discovered during a time that the timer T311 is activated, when the "UE Context" of the mobile station UE is not managed in the discovered cell, or when an inter-RAT cell is discovered during a time that the timer T311 is activated, then the AS function of the mobile station UE is transitioned to an idle state (RRC_Idle state).

In this case, the AS function of the mobile station UE notifies the NAS function of the mobile station UE that the RLF is detected. Alternately, the AS function of the mobile machine may notify the NAS function of the mobile station UE that the cell subject to the location registration is discovered by the cell selection process.

Thereafter, in step S104, the AS function of the mobile station UE starts a camping on a cell under the control of the radio base station eNB2.

In step S105, the NAS function of the mobile station UE transmits the location registration request signal to the mobile switching center MME, after a predetermined period elapses after receiving the above-described notification.

In step S106, the mobile switching center MME releases an S1 connection with the radio base station eNB1 for the mobile station UE. And, when there is the uplink data to be transmitted, the mobile switching center MME transmits the paging signal to the mobile station UE in step S107.

In step S108, in response to the received paging signal, the NAS function of the mobile station UE establishes a radio link with the radio base station eNB2, by transmitting a service request to the mobile switching center MME.

In step S109, the radio base station eNB2 transmits downlink data via the radio link established in step S108.

Secondly, the first operation of the mobile communication system according to the embodiment will be described with reference to FIG. 4.

Figure 4:
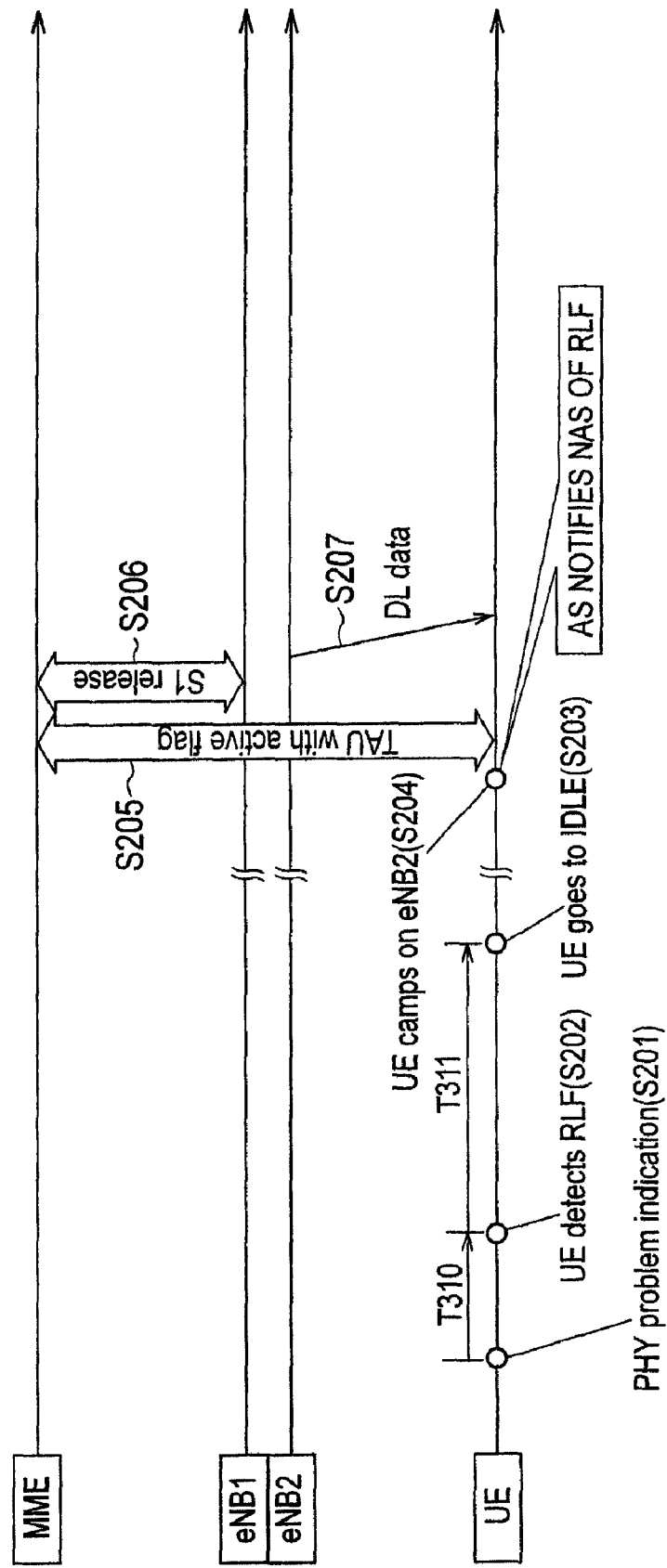
FIG. 4 is a diagram explaining an operation of the mobile communication system according to the first embodiment of the present invention.

As illustrated in FIG. 4, the operations from steps S201 to S204 are identical to those from steps S101 to S104 illustrated in FIG. 3.

In step S205, the NAS function of the mobile station UE transmits the location registration request signal including a flag (Active Flag) requesting a recovery of the radio link, to the mobile switching center MME, after a predetermined period elapses after receiving the above-described notification.

In step S206, the mobile switching center MME releases the S1 connection with the radio base station eNB1 for the mobile station UE, and establishes the S1 connection with the radio base station eNB2 for the mobile station UE. Moreover, the radio link is established between the radio base station eNB2 and the mobile station UE.

In step S207, the radio base station eNB2 transmits downlink data via the radio link established in step S206.

Operation and Effect of the Mobile Communication System According to the First Embodiment of the Present Invention According to the embodiment-based mobile communication system, when the AS function of the mobile station UE detects the RLF, the AS function of the mobile station UE is configured to notify the NAS function of the detection, and according to the notification, the NAS function of the mobile station UE is configured to transmit the location registration request signal to the mobile switching center MME. Thus, it is possible to reduce a time required for the mobile station UE to recover from the idle state, and it is possible to make it difficult for downlink data to be lost.

Moreover, according to the embodiment-based mobile communication system, the NAS function of the mobile station UE is configured to transmit the location registration request signal, after waiting for a predetermined time assigned to each mobile station UE after receiving the above-described notification, and thus, it is possible to avoid a situation where the transmission of the location registration request signal is congested at the tunnel exit, etc.

Furthermore, according to embodiment-based mobile communication system, the NAS function of the mobile station UE is configured to transmit the location registration request signal within a predetermined time assigned to each mobile station UE, after receiving the above-described notification, and thus, it is possible to avoid a situation where the transmission of the location registration request signal is congested at the tunnel exit, etc., by not allowing the location registration signal to be transmitted by, for example, setting a setting value to 0 (zero).

First Modified Example

Figure 5:
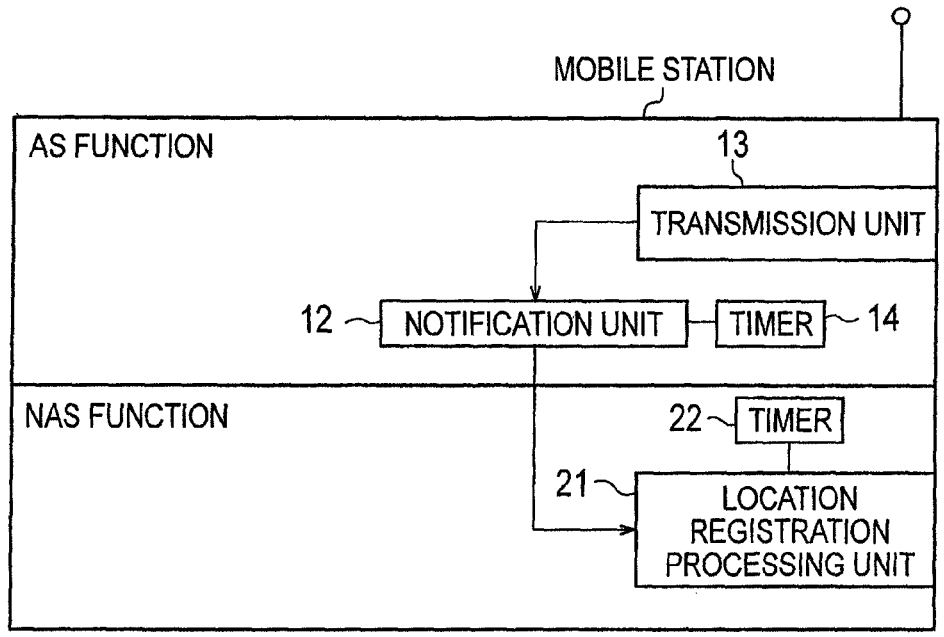
FIG. 5 is a functional block diagram of a mobile station according to a first modified example of the present invention.

With reference to FIG. 5, a mobile communication system according to a first modified example of the present invention will be described while focusing on the difference in the mobile communication system according to the above-described first embodiment.

As illustrated in FIG. 5, the AS function of the mobile station UE includes the notification unit 12, a transmission unit 13, and a timer 14. In this case, the AS function is configured to transition to an idle state, after an elapse of a first predetermined period after the failure (RLF) in the radio link established with the radio base station eNB is detected.

The transmission unit 13 is configured to transmit the uplink data.

The notification unit 12 is configured to monitor a time at which the uplink data is transmitted by the transmission unit 13, and to notify, to the NAS function, the transmission time of the uplink data.

The notification unit 12 is configured to notify, after a second predetermined period elapses after the data is transmitted last, the NAS function that the second predetermined period elapses after the data is transmitted last. In such a case, the timer 14 may be configured to measure the second predetermined period.

The NAS function of the mobile station UE includes a location registration processing unit 21, and a timer 22.

The location registration processing unit 21 is configured to transmit the location registration request signal to the mobile switching center MME, after the second predetermined period elapses after the data is transmitted last.

In this case, the timer 22 included in the NAS function is configured to measure the second predetermined period, and the location registration processing unit 21 may be configured to transmit, when the timer expires, the location registration request signal to the mobile switching center MME, determining that the second predetermined period elapses after the data is transmitted last.

Alternately, the timer 14 included in the AS function is configured to measure the second predetermined period, and the location registration processing unit 21 may be configured to transmit the location registration request signal to the mobile switching center MME, when the location registration processing unit 21 has received the notification that the second predetermined period elapses from the AS function after the data is transmitted last.

Second Modified Example

Figure 6:
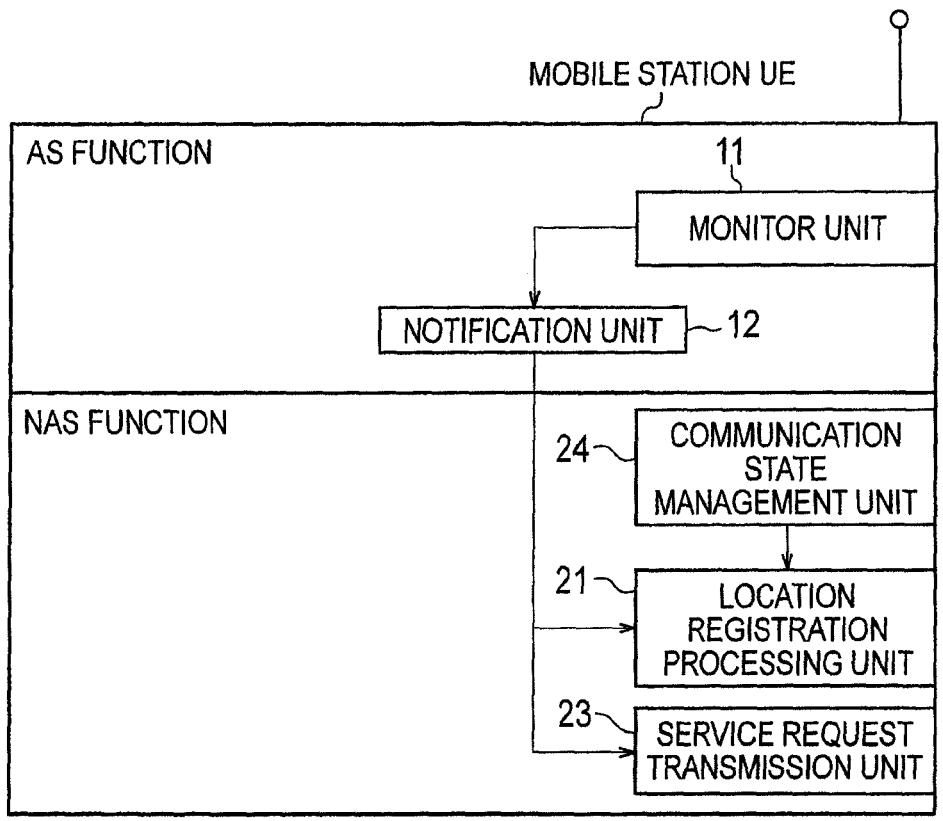
FIG. 6 is a functional block diagram of a mobile station according to a second modification of the present invention.
Figure 7:
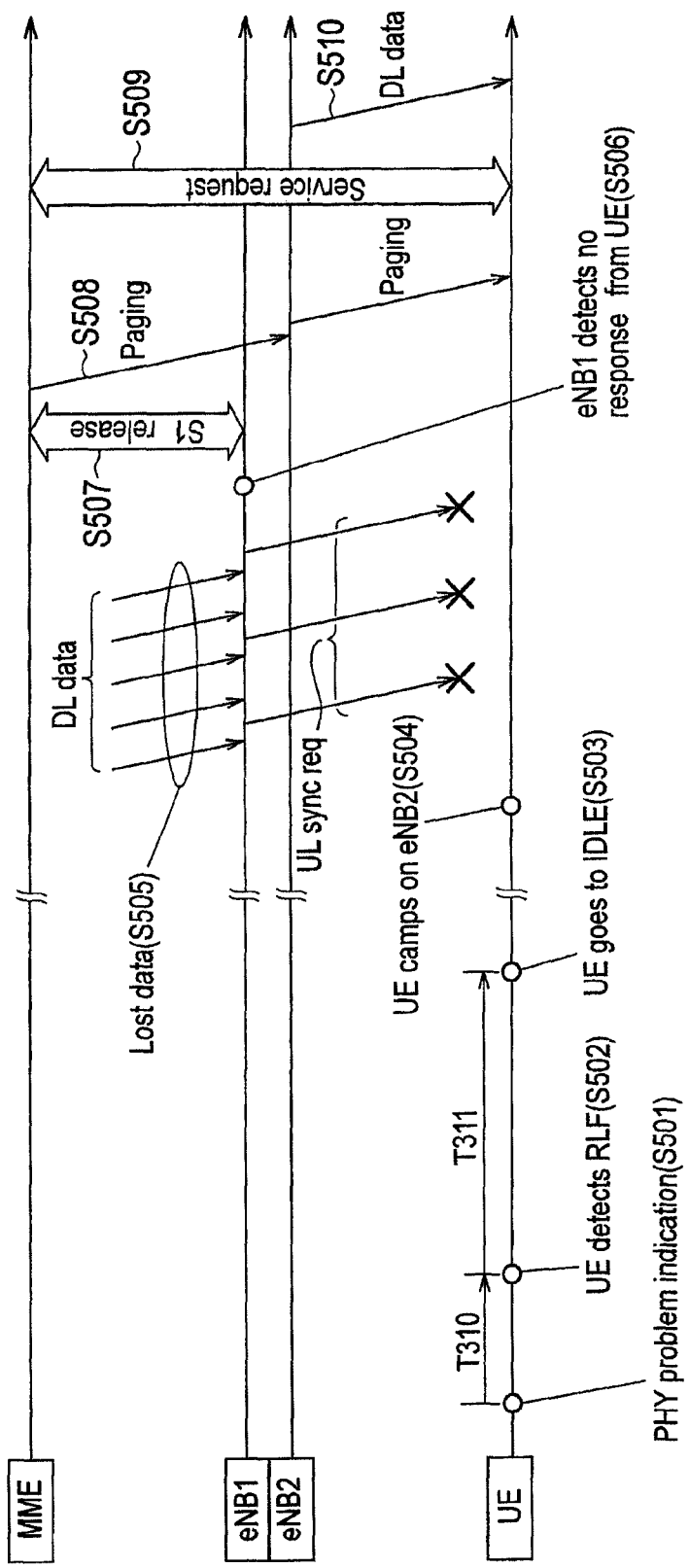
FIG. 7 is a diagram explaining an operation of a conventional mobile communication system of the LTE scheme.

With reference to FIG. 6, a mobile communication system according to a second modified example of the present invention will be described while focusing on the difference in the mobile communication system according to the above-described first embodiment.

As illustrated in FIG. 6, the configuration of the mobile station UE according to the second modified example is identical to that of the mobile station UE according to the above-described first embodiment except that a communication state management unit 24 is provided as the NAS function.

The communication state management unit 24 is configured to manage a type of communications performed via each radio link. In this case, when the type of communications is managed, QoS of the communication may be managed, or information indicating whether the current service is a real time service may be managed.

The location registration processing unit 21 is configured to determine whether or not to transmit the location registration request signal, based on the type of communications performed via the radio link in which the failure has been detected by the AS function.

For example, the location registration processing unit 21 is configured to transmit the location registration request signal when the type of communications performed via the radio link in which the failure has been detected by the AS function is a specific communication, and not to transmit the location registration request signal when the type of communications is other than a specific communication.

Third Modified Example

The location registration processing unit 21 may be configured to transmit the location registration request signal (RAU: Routing Area Update, LAU: Local Area Update) to the cell under the control of a discovered mobile communication system of the WCDMA scheme, when the cell under the control of the mobile communication system of the LTE scheme is not discovered in the cell selection process.

In this case, the location registration processing unit 21 may be configured to transmit the location registration request signal to the cell under the control of the discovered mobile communication system of the WCDMA scheme, even if an "ISR (Idle state Signaling Reduction)" is applied.

The operation of the above-described mobile station UE or radio base station eNB or mobile switching center MME may be implemented by a hardware, may also be implemented by a software module executed by a processor, and may further be implemented by the combination of the both.

The software module may be arranged in a storing medium of an arbitrary format such as RAM(Random Access Memory), a flash memory, ROM(Read Only Memory), EPROM(Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the mobile station UE or the radio base station eNB or the mobile switching center MME. As a discrete component, such a storing medium and processor may be arranged in the mobile station UE or the radio base station eNB or the mobile switching center MME.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile station comprising:
   an AS (Access Stratum) function corresponding to an AS terminated between the mobile station and a radio base station; and
   an NAS (Non Access Stratum) function corresponding to an NAS terminated between the mobile station and a mobile switching center,
   wherein
   the AS function is configured to activate a first timer, when a quality deterioration of a radio link established with the radio base station is detected;
   the AS function is configured to detect a failure in the radio link and to activate a second timer, when the quality deterioration of the radio link is not recovered before the first timer expires;
   the AS function is configured to transition to an idle state, when a specific cell is discovered during a time that the second timer is activated, and when the AS function attempts to establish a radio link with a radio base station that manages the specific cell and the establishment of the radio link is failed, and to notify, to the NAS function, the failure; and
   the NAS function is configured to transmit, in response to the notification, a location registration request signal to the mobile switching center.

2. The mobile station according to claim 1, wherein the NAS function is configured to transmit, even if an ISR is applied, the location registration request signal in response to the notification.

* * * * *